(12) United States Patent  (10) Patent No.: US 8,757,552 B1
Martin  (45) Date of Patent: Jun. 24, 2014

(54) DISPERSED SPACE BASED LASER WEAPON

(71) Applicant: Rick Martin, Longmont, CO (US)

(72) Inventor: Rick Martin, Longmont, CO (US)

( * ) Notice: Subject to any disclaimer, the term of this patent is extended or adjusted under 35 U.S.C. 154(b) by 53 days.

(21) Appl. No.: 13/922,648

(22) Filed: Jun. 20, 2013

Related U.S. Application Data

(60) Provisional application No. 61/770,125, filed on Feb. 27, 2013.

(51) Int. Cl.
*B64G 1/10* (2006.01)
*B64G 1/24* (2006.01)

(52) U.S. Cl.
CPC .................................... *B64G 1/242* (2013.01)
USPC .................. 244/158.4; 244/158.1; 244/172.7

(58) Field of Classification Search
USPC ........... 244/158.1, 158.4, 159.4, 172.7, 172.8
See application file for complete search history.

(56) References Cited

U.S. PATENT DOCUMENTS 3,535,543 A * 10/1970 Dailey ............................ 307/149
4,402,480 A *  9/1983 Udell .......................... 244/158.1

OTHER PUBLICATIONS

Ann L. Fischer, Solar from Space, article, Photonics spectra, www.photonics.com/Article.aspx?AIO=386277.
Luis Martinez, Navy's New Laser Weapon Blasts Bad guys from Air, Sea, Yahoo! News, Apr. 8, 2013.
Nestor Armesto, Hao Ma, Mauricio Martinez, Yacine Mehtar-Tani, Carlos A Salgado, Medium-induced soft gluon radiation in DIA, Jul. 5, 2012.
Ramakrishnan Mahadevan, Mohit Chhabra, Puneet Pasrich, Frank Barnes, A review of Batter Technologies:Past, Present & Future, University of Colorado, Boulder.

* cited by examiner

*Primary Examiner* — Philip J Bonzell
*Assistant Examiner* — Nicholas McFall
(74) *Attorney, Agent, or Firm* — Patent Law Offices of Rick Martin, P.C.

(57) ABSTRACT

A dozen or more orbiting solar generators stay in constant touch. They can be congregated rapidly in space at any desired secret location. Once congregated they all focus their energy to a death star. This death star is a newly launched ICBM with a microwave or laser collector. A laser generator uses this huge energy to project a non-nuclear death ray to a target. The target could be a city, a ship or a satellite. In the event of an asteroid approaching earth, this system could destroy an asteroid. In peacetime the orbiting solar generators supply electric power to an earth based power grid.

11 Claims, 6 Drawing Sheets

DISPERSED SPACE BASED LASER WEAPON

CROSS REFERENCE

This is a non-provisional application deriving priority from U.S. Patent Application 61/770,155 filed Feb. 27, 2013.

FIELD OF INVENTION

The present invention relates to providing a non-nuclear weapon of mass destruction, wherein a plurality of orbiting solar power generators (microwave and/or laser) coordinate their energy to a newly launched death star that focuses this coordinated laser energy to a target.

BACKGROUND OF THE INVENTION

Death star super weapons have been designed but not implemented. One key reason is the vulnerability of a giant orbiting weapon from ICBM's and/or killer satellites and/or space based nuclear explosions.

The present invention eliminates that vulnerability. Many dozen small orbiting solar generators (cells) are launched so that each cell continuously generates solar energy as exemplified in the international space station. Each cell communicates not only with earth control stations, but with each other. Each cell has an onboard processor that continuously calculates how the group of cells could quickly organize into a small area and focus their energy to one death star.

This death star can be launched at a moment's notice from earth. It is not a sitting duck. Ideally a group of death stars would continually move about the earth on tracks, ships, airplanes or in orbit.

When an attack is ordered at least one death star is launched to the rendezvous point of a group of cells. The death star obtains an orbit and fixes the target(s) in its guidance system.

The death star can have a burst power laser powered by the accumulation of dozens of cells. Or it may be a reverse telescope that focuses multiple laser rays from cells and concentrates a super laser beam to the target.

An enemy would have to obtain and destroy virtually all of the cells to knock the weapon out. Or the enemy would have to obtain and destroy multiple death star ICBM's coming from anywhere on earth.

Even this knock out scenario is not a fatal blow to the system. Since one cell can power a city of 80,000, a dozen cells could power a city of a million people. This system could focus a dozen (or more) cells at a target, such as a city, and produce the equivalent of Sherman's march through Georgia, all in a non-nuclear manner using microwave energy. All this destructive force can be done without the death star at all.

In the ideal scenario the cells would initially function as an orbiting solar generator for a city. A beam of microwave energy, perhaps five miles wide, is generated by a geostationary orbiting solar generator. PG&E is producing one system now.

THE SOLAR POWER CELL

Solar from Space
By Anne L. Fischer

The sun shines 24/7 in outer space, so it is not surprising that solar power seekers worldwide are setting up shop out there—or at least taking steps in that direction.

Solar power drawn from space-based satellites is not a new concept. It was prevent in the Journal Science in 1968 and patented by Dr. Peter E. Glaser in 1973. During the energy crisis of the 1970's the US Department of Energy studied space-based power, proving that, although technically feasible, it was economically impractical and less efficient than other forms of energy.

In the 1990's, NASA revived the concept with the "Fresh Look" study and, by 2007, with a revived focus on renewable energy sources, many groups—both government and industry—had stepped up the studies and the investment. Over the course of three decades, the US government and NASA have collectively invested about $80 million in the study of space—based solar.

The most common approach to space—based solar power generation would place satellites into geostationary orbit—a 24-hour revolution synchronized with the Earth's rotation—at an altitude of 22,500 miles. The satellite would be equipped with photovoltaic solar panels that would collect sunlight and, using solid-state power amplifiers, would convert the solar power to 2.45 or 5.8 GHz microwaves that would be beamed to a receiver on Earth. The receiver, called a rectenna, would convert microwave energy into electricity, which would be sent to a local power grid.

John C. Mankins, who formerly managed NASA's space solar power studies and who now owns Managed Energy Technologies of Ashburn, Va., said that this is no small undertaking. Speaking with Jeff Young on National public Radio's "Living on Earth" program, he said that the transmitter would measure about a half mile across, or the equivalent of approximately 20 international space stations. The beam would be about a half mile wide in space and would spread to about four miles wide when received on Earth.

"You'd certainly want to take the right precautions, keep the energy density, the amount of power that's in a square meter of the beam low enough to be safe," he told Young.

Not without Challenges

As with the development of all forms of solar power, a huge challenge is the generation power cheaply, reliably and safely. Generating it in space adds variables, including finding materials that can withstand high temperatures, placing huge satellite transmitters into space and placing receivers on Earth, and ensuring that the beams sent to Earth are not harmful to humans or to the environment.

Research and development costs aside, the biggest ticket item is expected to be the cost of launching the satellites. Space Energy AG of Switzerland has made great strides toward developing its solar from space concept, and its business plan allocates about $125 million just to hoist its satellite into space.

The beam of microwave energy would measure a mile or two across and would pass through the atmosphere easily. Some energy would be lost, although exactly how much is not yet know, and skeptics could raise disaster ridden questions: What if the beam strays? Could birds or humans be harmed? Would the beam affect weather or cause other changes to the environment?

Dr. James Logan, former chief of medical operations at NASA's Johnson Space Center, has studied these issues and has answers to many of the questions: If the beam strayed, for example, it could be defocused. If birds passed through the beam, they would feel some warmth, but microwave radiation is nonionizing and cannot make a charged particle that would damage DNA or biomolecules.

Signing Up

Pacific Gas and Electric Co. (PG&E) of San Francisco recently signed a supply agreement with Solaren Corp. of Manhattan Beach, Calif., for 200 MW of electricity generated in space and transmitted by microwave beam to a receiving station in Fresno County, Calif. The contract calls for the power to begin to flow in 2016.

In an interview posted on PG&E's Next 100 Web site, Solaren CEO Gary Spimak said he is confident that, by using proven technology and designs, and through extensive testing, the company will be able to deliver on the contract.

Others also are working at commercializing space based solar power. Space Energy is developing solar satellites, and the Japanese Aerospace Exploration Agency (JAXA) plans to have a 1-GW satellite in orbit by 2030 but has not decided whether it will beam microwave or laser beams back to Earth. In conjunction with Mitsubishi Electric and Electronic USA of Cypress, Calif., it is working on the concept of a space solar power system composed of multiple satellites orbiting in formation.

Another group, sponsored by The Discovery Channel, conducted land—based tests last year, sending a microwave beam from solar collectors on a mountaintop in Maui, Hi. The beam was transmitted about 90 miles, or the equivalent of the distance it would have to penetrate from space. The transmission was successful but sent only about 20 W with a limited setup.

Turning Talk into Action

No one country owns space, so it makes sense to work on an International level to resolve many of the hurdles. A global dialogue has been taking place in many forms. For example, in September, the International Symposium on Space—Based Solar Energy will take place in Toronto, sponsored by SPACE Canada in cooperation with the International Academy of Astronautics. A lot of the talk will be focused on perhaps the greatest hurdles for space—based solar: regulatory and licensing issues around frequency allocations, orbital slots and liability. Nonetheless, with promises such as that made by Solaren, space—based solar may be moving into the sphere of reality.

Solar-Powered Space Station

The International Space Station is a great example of solar power at work. The largest spacecraft ever in orbit, it has a wingspan of approximately 361 ft. and a length of 262 ft. It weights 1 million pounds and orbits at an altitude of approximately 220 nautical miles. Six astronauts currently are conducting experiments in its six laboratories.

The space station is powered by four power modules with two solar arrays on each. The eight arrays produce around 120 kW of usable electricity—enough to run about 42 average size homes. The arrays play a critical role, supplying power to such things as the systems that provide or control the air the astronauts breathe, food storage and temperature controls.

Each wing uses 32,800 solar cells manufactured by Spectrolab Inc. of Sylmar, Calif., a Boeing Corp. company. The fourth set of solar arrays was attached in March by two space walking astronauts, with the assistance of a robotic arm that held the $300 million, 14-ton power module. With the power supplied by the fourth wing, the space station now provides living quarters of six astronauts, double the number prior to the new installation. The astronauts also have enough power for life support and for taking on additional scientific studies.

Designed in the 1990s, the solar cells are silicon-based. Spectrolab President David Lillington describes the cells as being the largest produced at the time, measuring just over 60 $cm^2$. He said that the cells can turn about 14.5 percent of the solar spectrum into electricity. Uniquely designed, the front contacts to the solar cells wrap through to the back side via small holes drilled through the cells.

The space station provides an ideal environment of evaluation of new solar cell technologies and materials through NASA's Materials International Space Station Experiment test bed. In addition, much can be learned about the effects of atomic oxygen, Lillington said.

Solar cells in space are not without their tormentors. Space debris can take them out quickly. Carter Reznick, a Boeing engineer, said that, because working on or replacing the cells is not a simple process, the station is equipped with far more of them than necessary. A cell's power drops off over time, but constant monitoring via sensors has shown that all 82 circuits are working and that there has been no measurable drop thus far. END.

Thus, America could maintain perhaps one solar generator per state. The costs would in part be paid by the space based electrical energy.

For wartime use these cells could be scattered all over various orbits. Then the death star(s) completes a rendezvous. The totality of the microwaves from just ten cells could power a city of one million.

The death star laser generator focuses this energy into a beam. Directing this beam over targets such as cities, military bases or ships would define a weapon of mass destruction, without nuclear blowback.

SUMMARY OF THE INVENTION

The main aspect of the present invention is to disperse an enormous orbiting power generator array of cells such that it is not possible to obtain and destroy all the power generating cells.

Another aspect of the present invention is to continuously communicate location data among the cells so that a rapid rendezvous of multiple cells could be setup anywhere over the earth.

Another aspect of the present invention is to produce an ICBM energy collector such as a microwave or laser concentrator. This ICBM is called a death star.

Another aspect of the present invention is to continuously move a plurality of death stars all around the earth ready to launch.

Another aspect of the present invention is to coordinate the launch of a death star and the rendezvous of several power generating cells rapidly.

Another aspect of the present invention is to combine the discharging of multiple cells into the death star and create a non-nuclear weapon of mass destruction.

Another aspect of the present invention is to direct several cells' microwave energy onto a target, thus, the heat can be turned up gradually.

Another aspect of the present invention is to utilize the cells as orbiting electrical generators in peacetime.

Other aspects of this invention will appear from the following description and appended claims, reference being made to the accompanying drawings forming a part of this specification wherein like reference characters designate corresponding parts in the several views.

LGM-118A Peacekeeper—a Potential ICBM Launch Vehicle

The post-boost vehicle system is made up of a maneuvering rocket, and a guidance and control system. The vehicle rides atop the boost system, weighs about 3,000 pounds (1,363 kilograms) and is 4 feet (1.21 meters) long.

Aboard the ICBM could be a super capacitor made, for example, from a Graphene—cu compound structure. See Harvesting and Storing Laser Irradiation *Energy With Graphene*—cu Compound Structure, Wenbin Gong, Cornell University Library, arXIV.org>physics>arXIV:1207.3131, 13 Jul. 2012 revised 15 Aug. 2012.

Graphene-metal compound structure has been reported as a novel and outstanding component used in electrical and optical devices. Publicly known is a first-principles study of graphene-cu compound structure, showing its capacity of converting laser energy into electrical power and storing the harvested energy for a long time. A real-time and real-space time-dependent density functional method (TDDFT) is applied for the simulation of electrons dynamics and energy absorption. The laser-induced charge transfer from copper layer to graphene layer is observed and represented by plane-averaged electron difference and dipoles. The effects of laser frequency on the excitation energy and charge transfer are studied as well. The enhancement of C-C σ-bond and decreasing of electron density corresponding to μ-bond within graphene layer are responsible for the ability of storing the harvested energy for a long time.

At present, graphene is considered to be an excellent candidate for development of carbon-based electronics and opto-electronics, thanks to-its properties, such as very high electron mobility, high current-carrying density and excellent heat dissipation. Recent progress in converting solar and mechanical energy into electric power by using carbon based materials has opened a door for a brand-new way of energy harvesting with high conversion efficiency. Up to ten times the storage to weight efficiency now known can potentially be achieved. In addition carbon-based supercapacitor shows its outstanding property of high values of capacitance and energy density which indicates the possibility of storing electrical charges efficiently. Of particular interest is the fact that graphene-based materials have demonstrated controllable surface and interface properties as well as tailored work functions via fictionalization during synthesis and/or post-treatment. Since the graphene can be n-type or p-type doped through contacting with different metals, it inspires fascination applications of harvesting irradiation energies such as laser. Previous works have studied the electronic transport through metal-graphene junction and the global photo-response in epitaxial graphene with metal contact, it is advantageous to explore the full picture of the electronic dynamic of the contacts at the nanometer scale with the existence of a laser.

It is found that electron transfer from copper layer to graphene sheet occurs when the compound structure is under the laser irradiation. Due to the electronic oscillation of graphene sheet, the external applied lasers with different frequency result in different electron transfers. The in plane σ-bond of graphene enhances after the laser irradiation while μ-bond decreases its electronic density. We infer this is responsible for the long-time life storage of the harvested energy based on this compound structure. A plane capacitor model could be used to describe this structure, then harvesting and storing laser irradiation energy is the procedure of charging the capacitor.

Presently public analysis suggests the use of a plane capacitor model to describe the compound structure under the irradiation of laser pulses; the induced charge distribution is then modeled as two sheets of charge. Harvesting and storing laser irradiation energy is the procedure of charging the capacitor.

The simulations of electron dynamics under irradiation of laser pulses are performed by using TDDFT method. The graphene-Cu compound structure is found to be an appropriate material to harvest laser energy and convert the absorbed energy into electric power. The mechanism of conversion is investigated in our study and the effects of laser frequency as well. It is found that by subjecting the compound structure to external alternation electric fields parallel to the layers, charge transfer occurs from the copper layer to graphene sheet. At the same pulse energy, the laser with longer wavelength induces more charge transfer. The enhancement of in-plane σ-bond in graphene should be the key point to store the harvested energy for quite a long time. The basic information on graphene-cu compound structure obtained in this work is useful for developing novel energy harvesting and storing other super capacitor modules might use barium titanate which can hold ten to one hundreds times the energy of to the capacitors. Estimates of energy storage known today are 44 MJ/m cubed. The potential output powers are very high for a short time. Then the super capacitor can be re-charged by the cells.

The Laser Weapon

The laser weapon on board the ICBM and its super capacitor energy source could be a weapons grade laser. This technology is publicly available as a ship board laser weapon. See news.yahoo.com/navys-laser-weapon-blasts-bad-215808231.html,©2013.

Early next year the Navy will place a laser weapon aboard a ship in the Persian Gulf where it could be used to fend off approaching unmanned aerial vehicles of speedboats.

The Navy calls its futuristic weapon LAWS, which stands for the Laser Weapon Systems. What looks like a small telescope is actually a weapon that can track a moving target and fire a steady laser beam strong enough to burn a hole through steel.

A Navy video of testing conducted last summer off the coast of California shows how a laser beam fired from a Navy destroyer was able to set aflame an approaching UAV or drone, sending it crashing into the ocean.

"There was not a single miss" during the testing, said Rear Admiral Matthew Klunder, chief of Naval Research. The laser was three for tree in bringing sown an approaching unmanned aerial vehicle and 12 for 12 when previous testes are factored in.

Navy officials have provided a few unclassified details. For example, the laser is designed to be a "plug and play" system that integrates into a ship's existing targeting technologies and power grids. Those factors make it a surprisingly cheap weapon.

Klunder says each pulse of energy from the laser "costs under a dollar" and it can be used against weapon systems that are significantly more expensive.

Rear Admiral Thomas Eccles, Navy Sea Systems Commander, says the beam can be turned on instantly and the ultimately "the generation of power is essentially your magazine. It's the clip we have" instead of bullets. "We deliver precision with essentially an endless supply of rounds."

The strength of the beam is flexible enough that at a lower intensity level it can be used to warn approaching ships and UAV's not to get too close to a Navy ship. Instead of using machine guns to fire non-lethal warning shots as navy ships do now, the laser can be aimed to "dazzle" the viewing sensors aboard the craft. That light effect warns the pilot of a small water craft or UAV that they are being targeted by a laser and to turn away. If they don't, the laser's power can be boosted to destroy the approaching craft.

Based on earlier testing the Navy is confident the laser is ready for real-world testing aboard the USS Ponce in the Persian Gulf. The ship was selected because of its mission to be an enduring presence in the Gulf to counter Iranian maritime threats in the region.

The laser could be a hundreds of megawatts per square centimeter. It could be a red helium neon laser. It could be pulsed so as to provide a deep penetrating using a Gaussian beam. This type of beam could generate high heat below the surface of a target. This high heat could cause an explosion beneath the surface of the target, thus, gaining a maximum destructive force from the space based laser beam.

In summary each orbiting solar cell could aim its laser beam at the ICBM super capacitor. The death star could fire at its target. The cluster of solar cells could replenish the super capacitor. The entire system could be re-located if an attacking missile(s) were detected.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
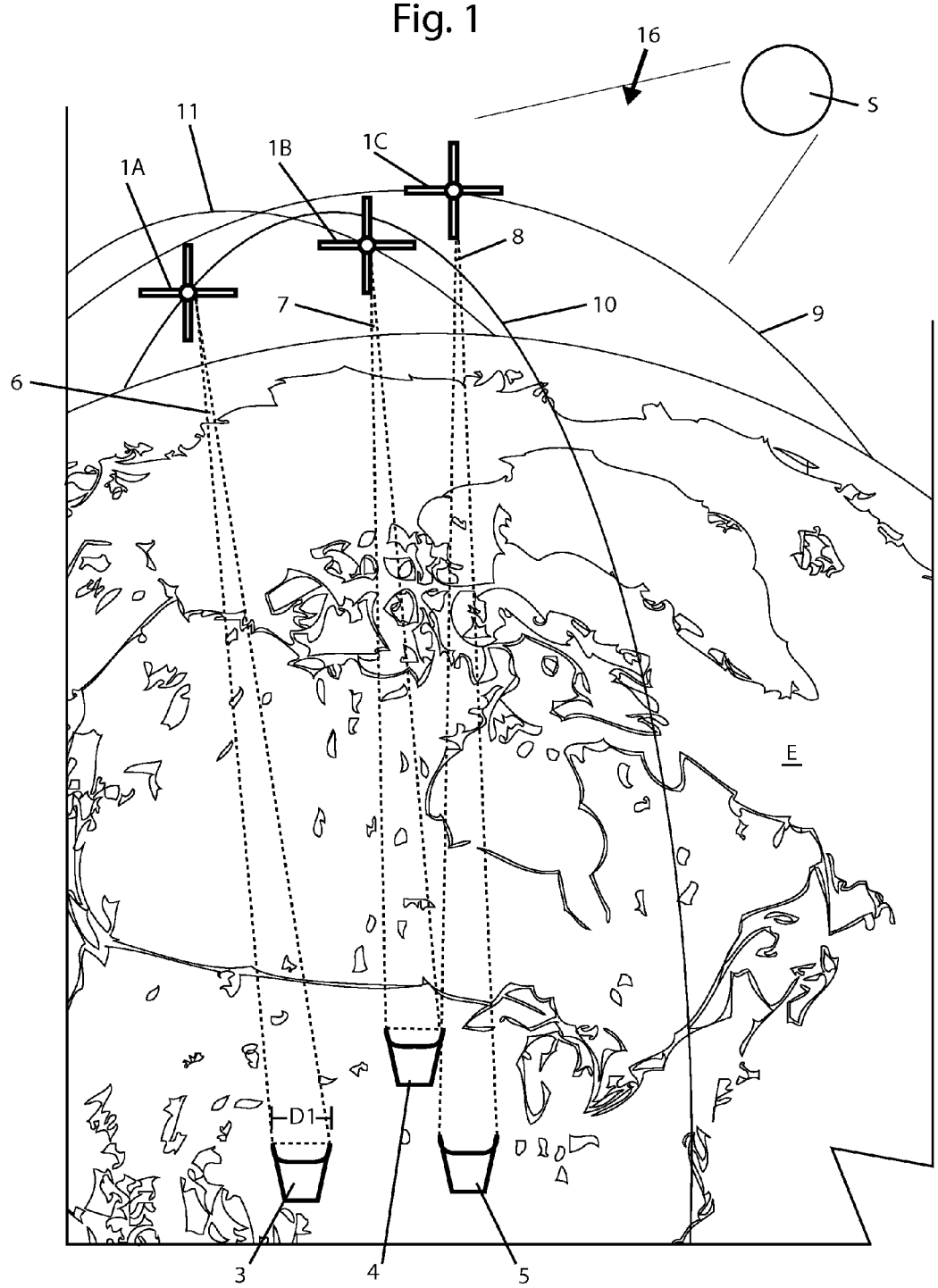
FIG. 1 is a space perspective view of a plurality of solar generation cells in use.

Referring first to FIG. 1 the earth E is shown from outer space with Canada and the northern half of the United States of America showing. Three geostationary orbiting solar generation cells are numbered 1A, 1B, 1C. Cell 1A is in orbit 10. Cell 1B is in orbit 11. Cell 1C is in orbit 9. Each cell collects solar energy on its panels. Each cell has a microwave converter which converts the collected solar energy to microwave energy. The microwave energy is transmitted to earth in beams 6, 7, 8. Each beam has an earth diameter D1 of perhaps five miles wide so as not to disrupt the atmosphere. Earth collector 3 converts microwave energy beam 6 to local electrical energy. Earth collector 4 converts microwave energy beam 7 to local electrical energy. Earth collector 5 converts microwave energy beam 8 to local electrical power.

Thus, this space based energy harvesting system 16 is a commercially viable earth power generator. The sun is labeled S.

Figure 2:
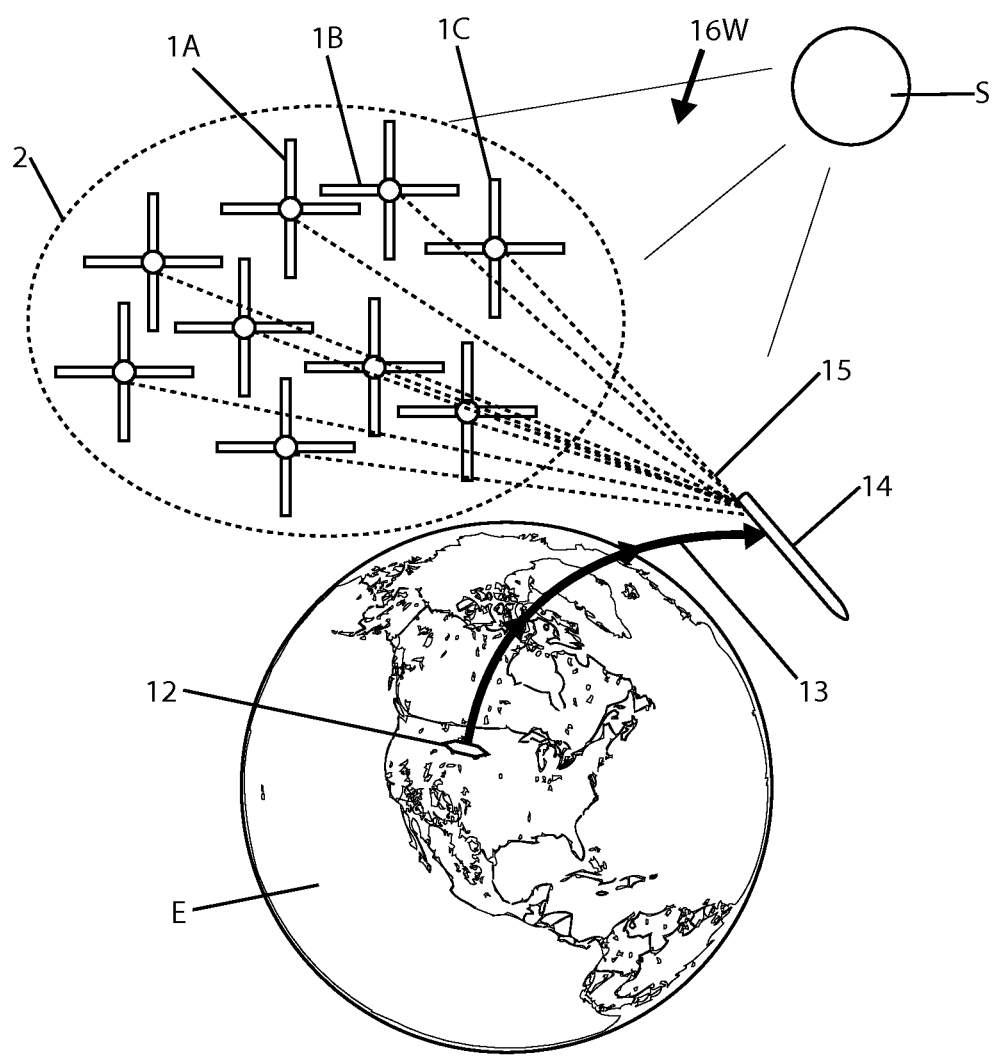
FIG. 2 is a space perspective view of a collection of cells moved into a cluster, and a death star launched to a rendezvous location.
Figure 3:
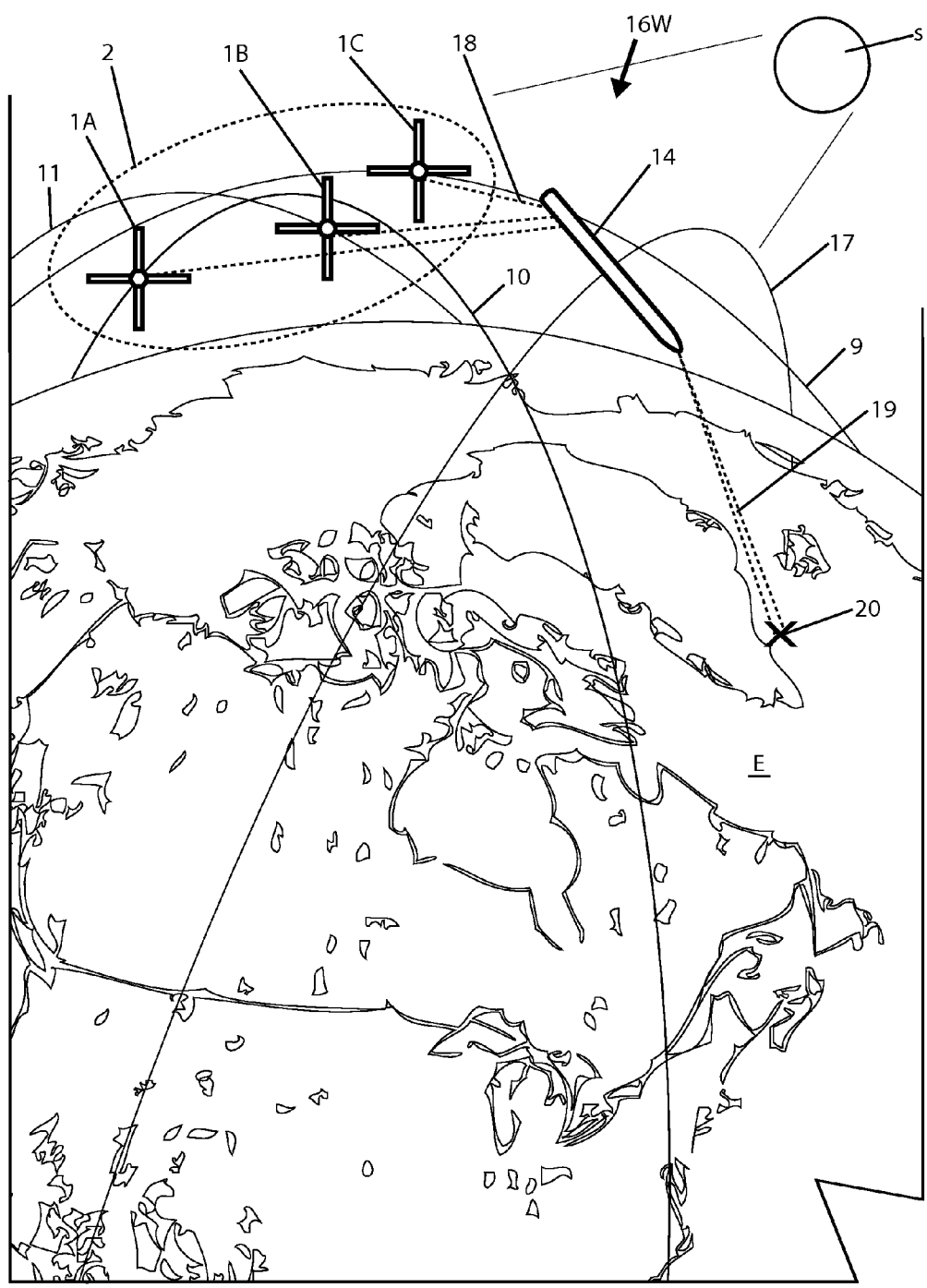
FIG. 3 is a space perspective of the death star attacking a ship.

Referring to FIG. 2 the system 16W is now a weapon of mass destruction. A cluster 2 of cells 1A, 1B, 1C etc. has been rapidly coordinated into a super power generator. Constant calculations among the cells and between an earth communications center (not shown, this could be a mobile unit), has created this cluster over a quadrant of the earth where a target has been identified. Alternately an incoming asteroid could be targeted. A cluster of death stars may be coordinated to destroy an asteroid or any space debris. At the same time the cluster 2 is formed, a death star ICBM 14 has been launched from a silo 12 into an orbit adjacent to the cluster 2. This silo 12 could be a mobile silo. Track 13 shows the path of the death star 14 into orbit. Once the path of the death star 14 is in orbit the cells of the cluster 2 are controlled to energize via beams 15, the laser inside of death star 14. High tech capacitance circuitry in death star 14 stores this accumulated energy until the target in FIG. 3 is in range of the death star 14 when the super laser beam 19 is unleashed on the target 20. This load and fire sequence can be repeated.

Also the array of cluster 2 and death star 14 can be re-assembled in hours over any target on earth. Also the target could be an intruding asteroid from outer space. Such a system could also destroy the accumulating space garbage mankind has launched for fifty years. It is feasible this super laser beam 19 could also be used for mining purposes. Orbit 17 shows the orbit of death star 14. Another possible use for super laser beam 19 is steam generation off a coastline to promote rain downwind.

Figure 4:
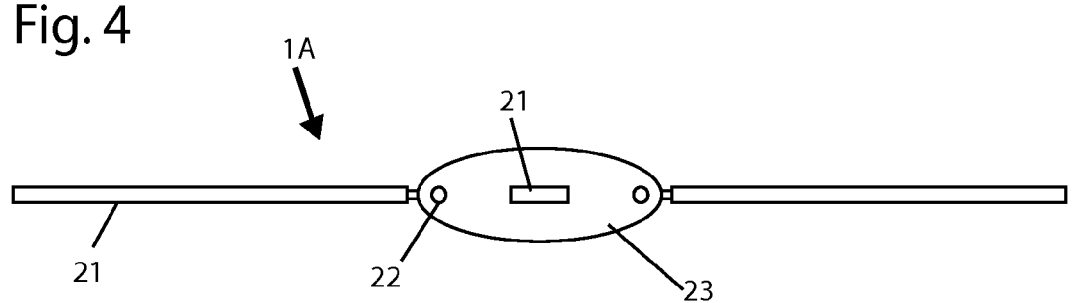
FIG. 4 is a side elevation view of a cell.
Figure 5:
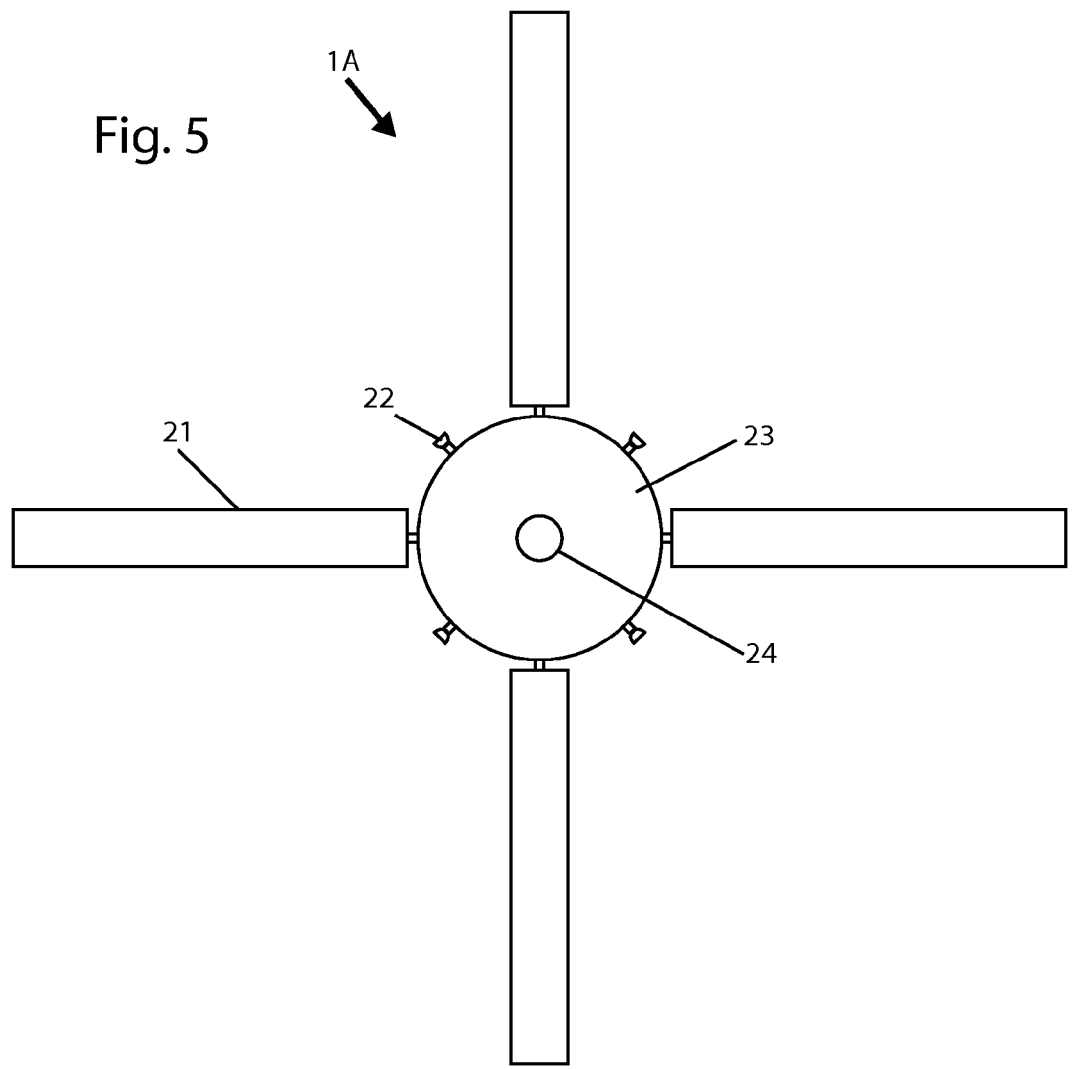
FIG. 5 is a top plan view of a cell.

Referring next to FIGS. 4, 5 a cell 1A is shown. The solar panels 21 collect sunlight and convert this energy to electricity in the central station 23. The electrical to microwave converter 24 is controlled to beam the microwave energy to either a stationary earth based electrical power plant 3 in FIG. 1, or to a death star 14 in FIG. 2. The onboard computer has duplicate navigation and communication subsystems to keep all cells in constant wartime readiness to deploy. Rocket thrusters 22 are guided to move the cell to a designated orbital location. It is envisioned that a single rocket launch could put dozens of cells in orbit.

Figure 6:
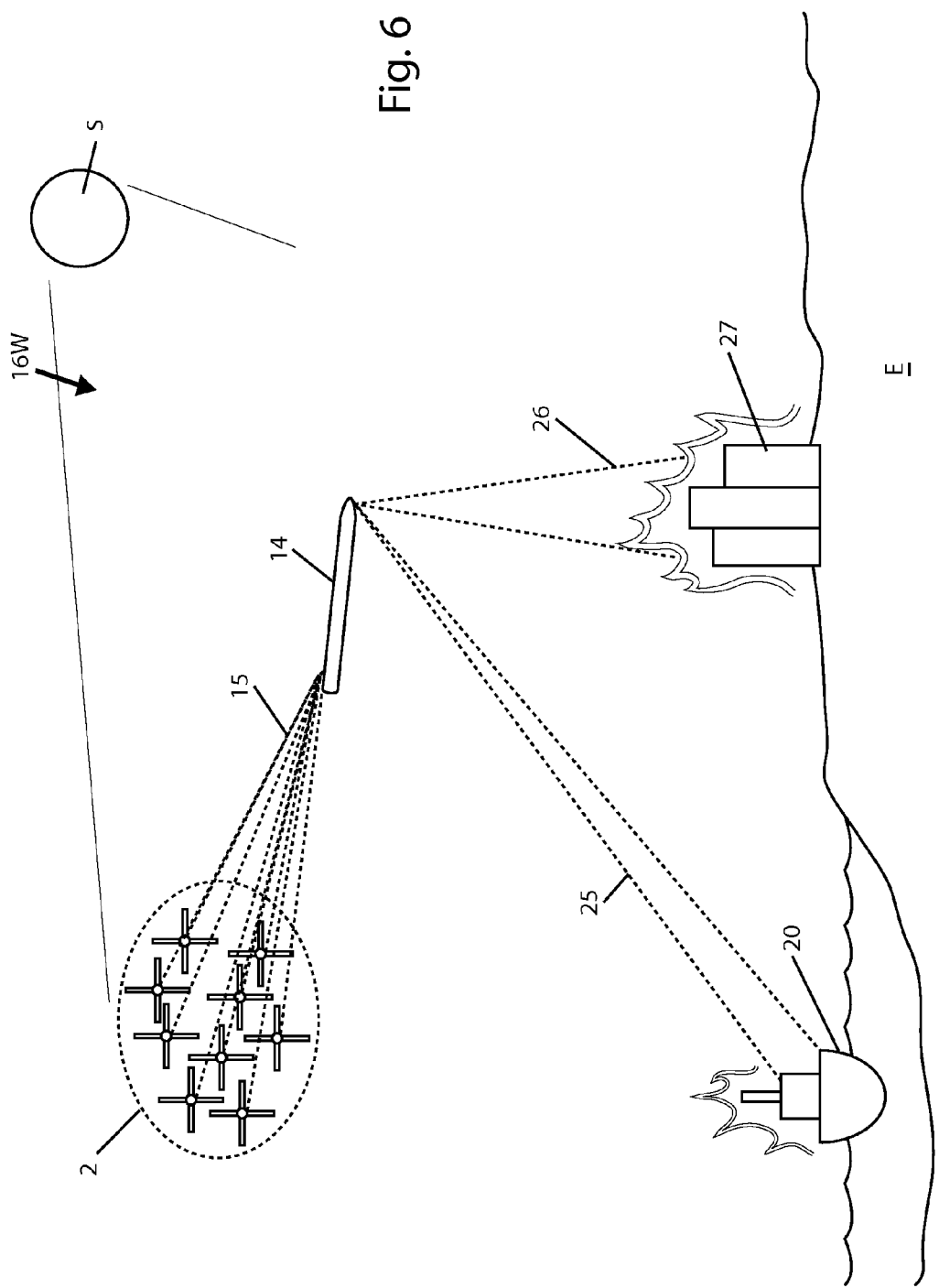
FIG. 6 is a land perspective view of a multi-target attack by a death star.

Referring next to FIG. 6 the system 16W is taking on multiple targets. Ship 20 using beam 25 and building 27 using beam 26 are hit at the same time.

Figure 7:
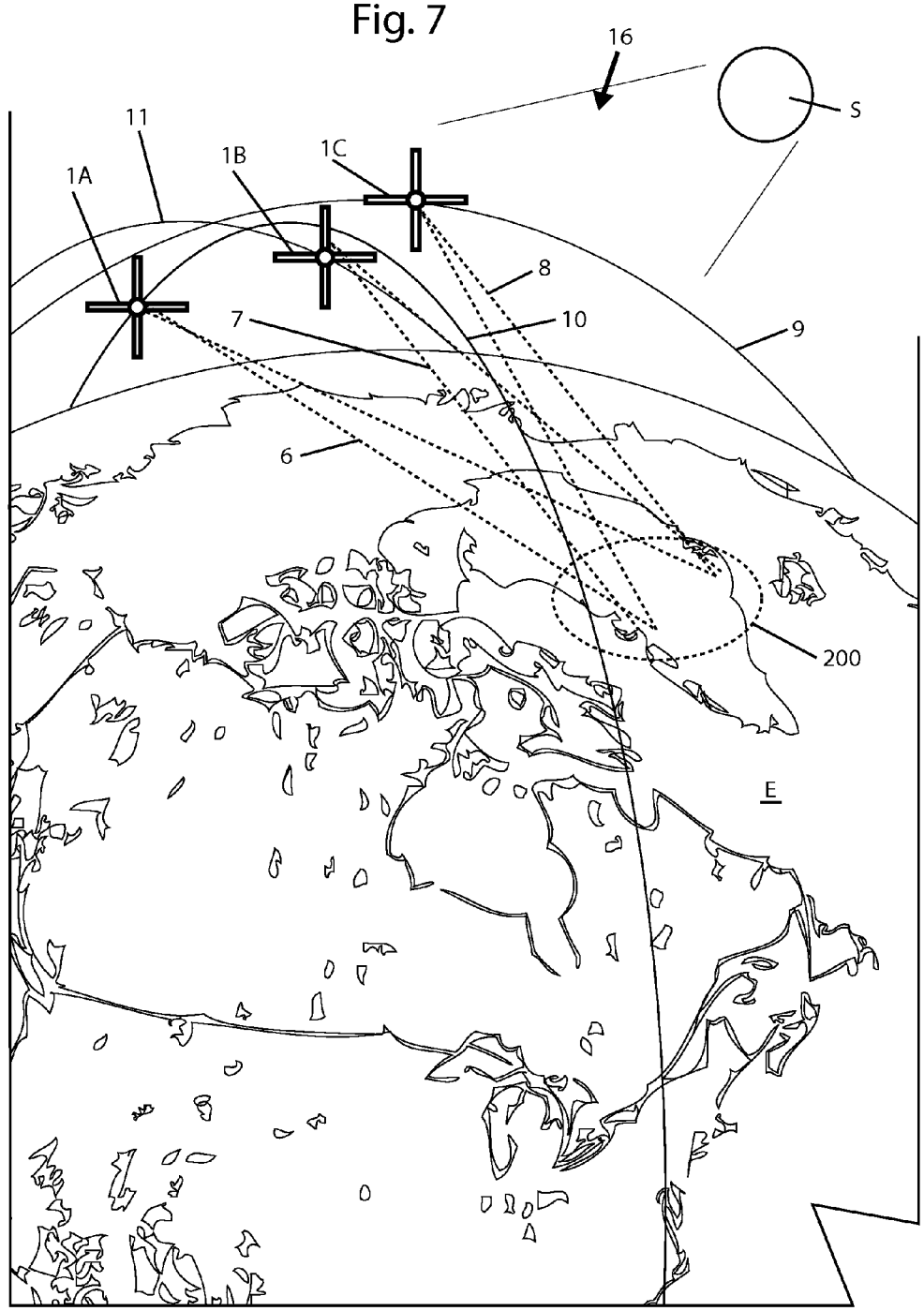
FIG. 7 is a space based perspective view of a multi-cell attack without a death star.

Referring next to FIG. 7 no death star is needed to enable system 16 to be a weapon of mass destruction. Target 200 is hit with a multitude of microwave beams 6, 7, 8 all focused on target 200 rather than on an electricity generator.

The target can be incrementally heated up as a surrender tactic or blasted with dozens of beams 6, 7, 8.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A space based weapons system comprising:
a plurality of orbiting solar powered cells;
each of said cells comprising an onboard computer and transceiver;
said onboard computer capable of receiving an instruction to move to a space location over the earth using an onboard thruster assembly;
each of said cells comprising a solar energy transmitting means functioning to send an energy ray to a first target;
said first target comprising an orbiting laser weapon having an onboard energy storage device;
wherein said energy storage device can receive energy from the plurality of orbiting solar powered cells; and
wherein said orbiting laser weapon can fire a laser beam at an acquired target using energy from the energy storage device.

2. The weapons system of claim 1, wherein at least one of the plurality of orbiting solar powered cells and its solar energy transmitting means provides an energy beam to earth which is converted into electric energy on a grid.

3. The weapons system of claim 1, wherein the first target and its orbiting laser weapon and its onboard energy storage device further comprise an onboard coordinating computer and earth transceiver, said on board coordinating computer further comprising a communicating link to the plurality of orbiting solar powered cells so as to coordinate a designated locating pattern of the plurality of orbiting solar powered cells to direct their respective energy rays to the onboard energy storage device on the first target.

4. The weapons system of claim 3, wherein the first target further comprises a component from an intercontinental ballistic missile (ICBM).

5. The weapons system of claim 4, wherein the first target further comprises a component of an earth based defense system that deploys the first target to a designated orbit and directs the first target to acquire its acquired target and fire its laser beam, said earth based defense system also directs the plurality of orbiting solar powered cells to rendezvous with the first target.

6. The weapons system of claim 1, wherein the instruction to move to a space location is sent by an earth transceiver.

7. The weapons system of claim 1, wherein the instruction to move to a space location is sent by an orbiting solar powered cell.

8. The weapons system of claim 1, wherein the instruction to move to a space location is sent by a space vehicle.

9. The weapons system of claim 1, wherein the onboard energy storage device further comprises a super capacitor.

10. The weapons system of claim 1, wherein the solar energy transmitting means energy ray further comprises a microwave energy ray.

11. The weapons system of claim 1, wherein the solar energy transmitting means energy ray further comprises a laser energy ray.

* * * * *